Oct. 21, 1958  J. G. SHARP  2,857,150
CENTRIFUGAL PUMP FOR CONTROL SYSTEMS AND
METHOD OF ESTABLISHING A FLUID PRESSURE
Filed June 14, 1954  2 Sheets-Sheet 1
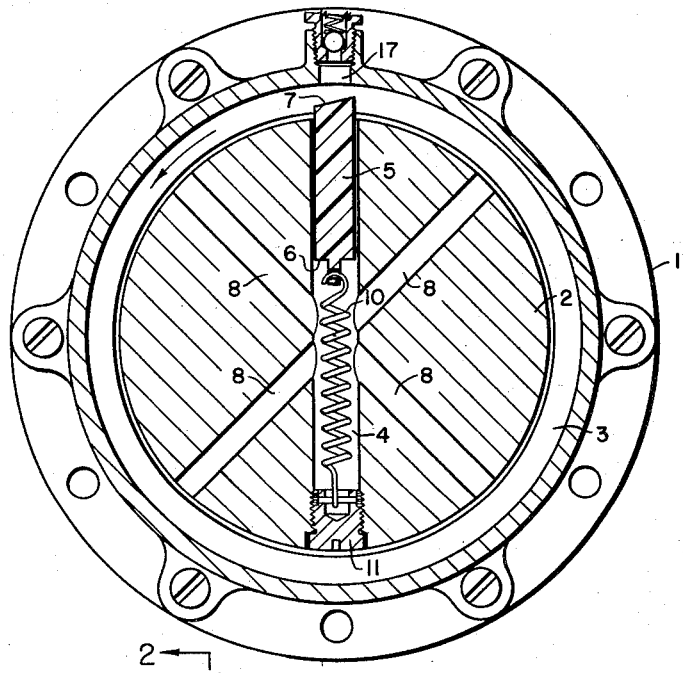
FIG. 2
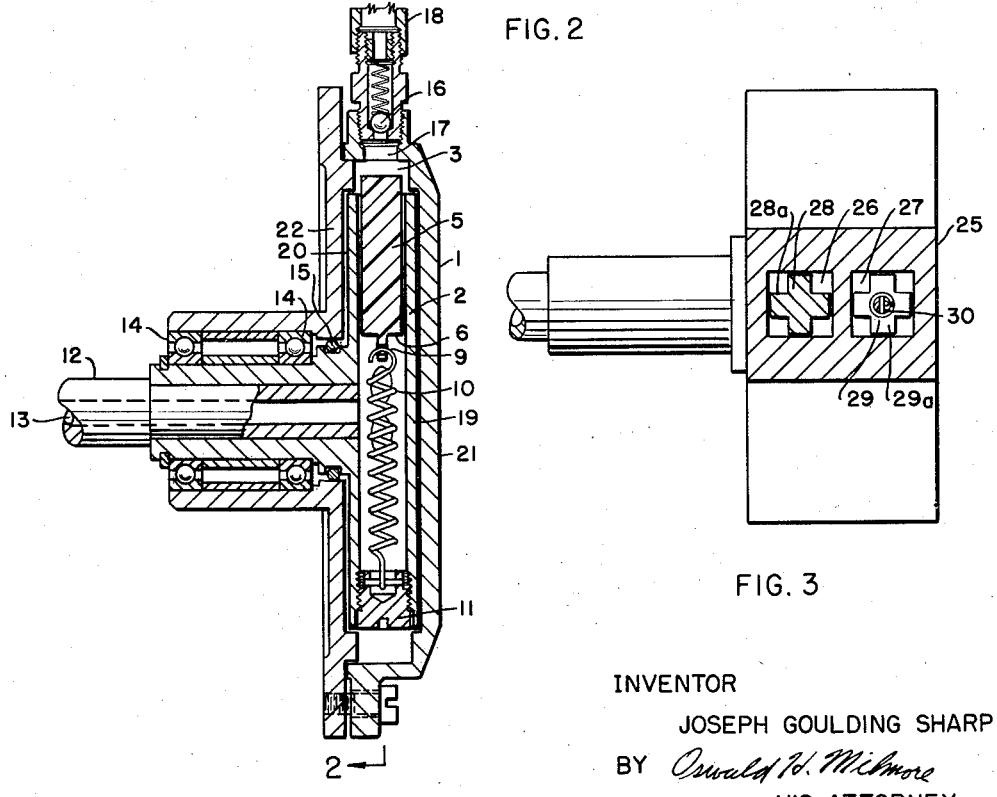
FIG. 3
FIG. 1
INVENTOR
JOSEPH GOULDING SHARP
BY Oswald W. Mickmore
HIS ATTORNEY

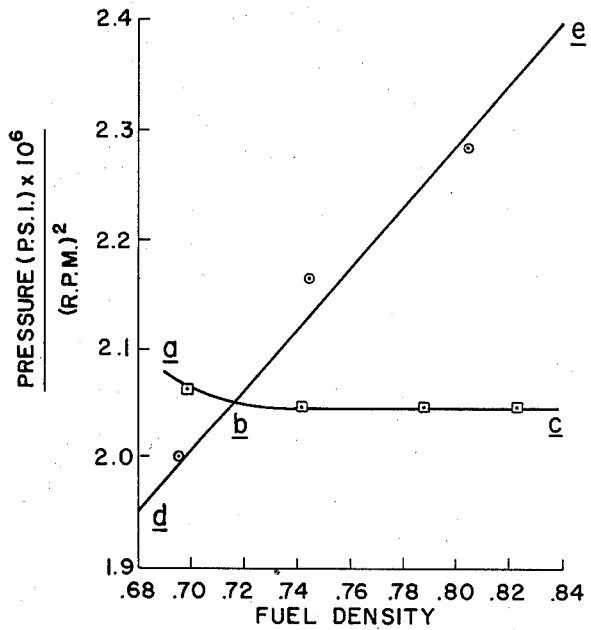
FIG. 5
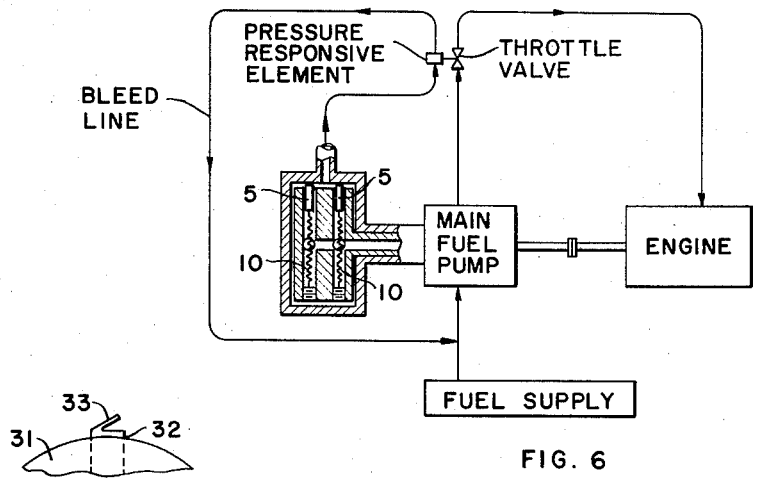
FIG. 6
FIG. 4
INVENTOR:
JOSEPH GOULDING SHARP
BY: H. D. Burch
HIS ATTORNEY United States Patent Office 2,857,150
Patented Oct. 21, 1958

2,857,150

CENTRIFUGAL PUMP FOR CONTROL SYSTEMS AND METHOD OF ESTABLISHING A FLUID PRESSURE

Joseph Goulding Sharp, London, England, assignor to Shell Development Company, New York, N. Y., a corporation of Delaware Application June 14, 1954, Serial No. 436,573

Claims priority, application Great Britain June 19, 1953

9 Claims. (Cl. 264—14)

The invention relates to centrifugal pumps that establish an output pressure determined substantially only by the angular speed of the pump rotor and to a method of generating such a pressure. Such pumps are suited, for example, for use in engine fuel control systems. In a particular application to which the pump and method are especially although not exclusively adapted the pump is coupled to a gas turbine embodied in an aircraft jet engine to rotate at a speed proportional to the engine speed to establish an output pressure that is related to, e. g. proportional, to the square of the shaft speed and the said output pressure is transmitted to a pressure-sensitive element that controls, usually through a servomechanism, the rate at which fuel is supplied to the turbine combustion chamber.

The invention will herein be described with reference to aircraft jet engines for the sake of brevity, but it should be understood that it may be applied to any gas turbine as well as to other control systems wherein an output pressure dependent upon speed of a variable speed drive device is desired.

It is the current practice to govern aircraft jet engines to insure that they do not exceed a certain predetermined speed. This control is sometimes effected by having a centrifugal pump running at the speed of the main fuel pump (which is geared to the engine) and which establishes what may be termed a control pressure in a separate portion or side stream of the engine fuel. This control pressure is arranged to vary the fuel supply to the gas turbine, for example, by acting on a pressure-sensitive element that operates a by-pass valve arranged in conjunction with the main fuel supply pump or that varies the inclination of a swash plate in a swash plate main fuel pump, etc. Such an arrangement is satisfactory, provided that the density of the fuel remains constant. This constancy, however, does not obtain with aircraft which must operate over a wide range of ambient temperatures, even if they are always supplied with the same type of fuel. A further difficulty arises from the fact that, due to increasing demand, it is becoming increasingly difficult to procure a fuel supply of a given density for a given engine; this is aggravated in the case of aircraft that take on fuel at diverse airports.

The need for constancy in the fuel density arises from the fact that the output pressure of a centrifugal pump varies not only with the effective radius and the square of the rotor speed but also with the density of the liquid.

This characteristic of centrifugal pumps has heretofore led to the construction of pumps having means for varying the radial location of the pump outlet (see U. S. Patents 2,269,009 and 2,407,139). These pumps can be adjusted to compensate for a change in liquid density but their output pressures are nevertheless determined by the liquid density in any adjusted position, since they have no provision for automatic correction. Other prior pumps having automatically adjusted elements (e. g., as shown in U. S. Patents 2,005,193 and 2,189,252) do not apply corrections that result in an output pressure that is essentially a unique function of shaft speed and independent of density.

It is an object of this invention to provide an improved centrifugal pump or pressure-producing device that will, without manual or other external adjustments, yield an output pressure that is essentially a unique function of shaft speed, despite variations in the density of the liquid, regardless of whether such variations are due to changes in the temperature and/or the composition of the liquid.

A further object is to provide a method of establishing a liquid control pressure that is determined by an angular speed irrespective of the density of the liquid.

The invention further has as its object the provision of an improved method and means for maintaining the control pressure in an engine fuel supply system as a definite function of engine speed and substantially independent of the fuel density.

In summary, the control pressure is established according to the invention by means of a centrifugal pressure-producing device including a rotor having passage means for the flow of liquid in a generally radially outward direction, and the effect of variations in liquid density on this control pressure is corrected by correspondingly varying the effective radius of the rotor, said variations in radius being dependent directly upon the density of the liquid.

The present invention also provides means for controlling the fuel supply to an engine, such as a gas turbine, which have the form of a centrifugal pressure-producing apparatus in which there is established in a part of the fuel a control pressure which is a function of the engine speed, said control pressure being modified by the position of a rotating and generally radially movable slide element which floats in the fuel in the sense that an increase in the fuel density urges the slide element toward the axis of rotation to decrease the effective radius of the apparatus.

This centrifugal apparatus preferably comprises a fixed outer casing, a rotor situated within the casing with a clearance, and a slide which is carried by the rotor and which according to its position determines the effective radius of the rotor and, hence, the control pressure established in the liquid, e. g., the fuel, that is in the said clearance between the rotor and the casing. The slide, to be able to determine the effective radius, must have a wall that engages the liquid and imparts angular momentum thereto increasingly with greater displacement of the slide outwardly from the axis of rotation. This liquid-engaging wall may be a part of the slide that projects radially beyond the periphery of the rotor to a variable extent into the said clearance, which is in this instance radial and at the outer periphery of the rotor.

The slide has opposed surfaces situated at different distances out from the axis and exposed to a continuous body of said liquid at said different distances; as a consequence of the differential pressure acting against these surfaces when the rotor is rotated the slide floats in the liquid. Any increase in the density of the liquid therefore causes the slide to move nearer to the axis of rotation, thereby decreasing the effective radius of the rotor. The result of this lesser radius is a tendency to decrease the output pressure; however, the output pressure is directly related to liquid density, so that the greater liquid density increases the pump delivery pressure. These two effects are in opposite directions, and it has been found possible to make the effects of the pump radius and of the liquid density on the pump delivery pressure very nearly equal, whereby the effect of variations in the liquid density become negligible. Similarly, with a decrease in fuel density the effects described above occur in the opposite directions.

Further features of the present invention are the provision of a bevelled portion on the part of the slide that projects beyond the rotor periphery into the radial clearance, in order to overcome certain difficulties otherwise associated with the flow of liquid over the protruding end of the slide; and also the provision of at least one radial passage, preferably within the rotor, to permit free radial liquid flow from the center of the rotor to the radial clearance, to compensate for leakage over the end or plane faces of the rotor. This radial passage may in some cases be the bore that also houses the slide, e. g., by providing grooves that permit the flow of liquid past the slide or by providing passages through the slide itself; this bore may further contain suitable guides for the slide. According to a variant the fuel flow is through the slide element.

One of the primary advantages of the centrifugal apparatus according to the present invention is the absence of any close dimensional tolerances.

The invention is further described with reference to the accompanying drawings forming a part of this specification and showing certain preferred embodiments thereof, wherein:

Figure 1 is a vertical sectional view taken on a plane containing the axis of rotation of the rotor;

Figure 2 is a transverse section taken on the line 2—2 of Figure 1;

Figure 3 is a sectional view taken transversely to the control bore, showing a modified construction;

Figure 4 is a fragmentary side elevation view of the rotor showing a further modified construction of the slide;

Figure 5 is a graph showing certain results achieved with the pressure-producing device of Figures 1 and 2 and Figure 6 is a schematic view showing the relationship of the various elements in a fuel supply system and shows in section a pressure producing device having two slide elements.

Referring now to Figures 1 and 2, the pressure-producing device shown therein has the form of a centrifugal pump comprising a stationary casing 1 (which may form a part of the casing of the main fuel supply pump of the turbine), and a rotor 2 situated therein with a radial clearance forming an annular space 3 and having fluid passage means including one or more radial control bores 4. A slide member 5 movable in a radial direction is mounted within the control bore 4, there being one slide member in each such bore if several are provided. The slide is situated to one side of the axis of rotation and has end faces 6 and 7 situated at different radial distances from the axis of rotation and exposed at these distances to a continuous body of the liquid. The liquid acting against these faces is a continuous body by virtue of one or more, e. g., four radial bores 8. The slide is connected by an eye 9 to a tension spring 10 that is anchored to the rotor by means of an anchoring plug 11. The rotor is fixed to a supporting shaft 12 having an axial bore 13 that communicates to the inner part of the rotor, whereby liquid, e. g., fuel from the engine fuel supply system, can flow to the bores 4 and 8. The shaft and rotor are suitably journalled with respect to the casing, as by bearings 14, and the rotor is sealed to the casing at 15 to prevent or reduce leakage. Means for collecting leakage, not shown, may be provided. It will be understood that the shaft 12 is coupled to a suitable variable-speed drive device, e. g., to the engine, generally by means of the main fuel supply pump shaft thereof. The casing has an outlet opening 17 situated at a part thereof outward from the axis of rotation, e. g., in the peripheral wall of the casing, to which is connected through a check valve 16 a conduit 18 leading to the pressure-responsive element, such as a servo-mechanism controlling the main fuel supply to the burners, whereby the main fuel supply pump is controlled as desired in accordance with engine speed. Such element may consume little or no liquid or may be provided with a bleed port, whereby liquid flows out through the conduit 18 and the device may be used in either type of system.

The outer end face 7 of the slide is preferably bevelled, e. g., at an angle of 35° as shown, with the shorter edge leading in the direction of rotation. When the bevel is omitted the device, although operative, does not give fully satisfactory results with a single spring 10; this is due to the formation of liquid eddies about the protruding end of the slide, which result in forces which move the slide inwards in an irregular manner.

In operation, liquid supplied to the inner part of the rotor through the bore 13 flows out through the radial bores 8 and fills the control bore 4 and the casing. Rotation of the rotor causes the liquid pressure to increase with the distance from the axis of rotation. This rotation also causes the slide to move outwards against the tension of the spring 10. Outward motion of the slide is further opposed by the differential of the pressures of the liquid acting against the inner and outer faces 6 and 7, the latter being greater; the result is that the slide tends to float in the liquid. Since the said differential becomes greater as the density of the liquid increases, the equilibrium position of the slide at any particular angular speed of the rotor is relatively farther from the axis with lower liquid densities and closer to the axis with greater liquid densities. It follows that the slide 5 assumes a radial equilibrium position determined by the rotor speed, the tension of the spring 10, the volume displaced by the slide 5, and the density of the liquid.

A certain amount of the liquid discharged from the outer ends of the radial bores 8 leaks back toward the rotor axis by passing through the clearances between the flat end faces 19 and 20 and the adjoining inner faces of the casing end walls 21 and 22. The amount of this flow depends upon the effectiveness of the running seal between the casing and rotor at the bearings and the arrangement used to supply liquid. The aggregate cross sectional area of the radial bores 8 must be sufficiently large to prevent this leakage from having any marked effect on the control pressure established at the outer circumference of the casing 1 near the outlet 17.

The action of the slide in determining the effective radius of the rotor is as follows: The wall of the slide 5 that protrudes into the annular space 3 imparts angular momentum to the liquid in this space. The extent to which the outer end 7 of the slide protrudes, in conjunction with the rotor speed, determines the speed with which liquid moves circumferentially about the casing through the said annular space; this, in turn, determines the liquid head. The pressure of the liquid at the outlet 17, being equal to the product of the liquid head and the liquid density, will for any given rotor speed and position of the slide increase with an increase in liquid density. However, such an increase in liquid density causes the slide to assume an equilibrium position closer to the axis of rotation, as was described previously, whereby the effective radius of the rotor is decreased with a resultant compensating decrease in the output pressure. In this way the static pressure of the liquid at the outer circumference of the casing is maintained substantially constant despite changes in liquid density. In other words, the decrease in the rotational speed of the liquid counteracts the increase in the control pressure due to the increased liquid density.

By using a single tension spring 10 of fourteen turns with a rate of about 5 lbs./inch, using a slide member 5 made of vulcanized material (e. g., that known under the British trademark "Tufnol") having a 35° bevel, and using a rotor having a diameter of four inches, with the other dimensions in the proportion shown in Figures 1 and 2, it has been found possible to provide adequate compensaiton of liquid density variations over a large range corresponding to those found in available gas turbine fuels.

It will be appreciated that two or more slides 5 may be provided; in such case either the slides 5 and springs 10 must together be shorter than the radius of the rotor 2 or, if they occupy a diametrical bore as shown, the rotor must be extended axially to accommodate them in different transverse planes. This latter arrangement is shown in Figure 6. Also, if the cross sectional area of the control bore or bores housing the slide or slides 5 is large enough, the bores 8 may be dispensed with, provided that guide means are provided to insure the radial movement of the slide or slides with adequate liquid flow over the exterior of the slide or slides. These modifications are illustrated in Figure 3, wherein the rotor 25 is axially elongated to provide two control bores 26 and 27 containing slides 28 and 29 disposed on opposite sides of the axis, provided with tension springs of which only the spring 30 appears. The guide means are in the form of the ribs 28a and 29a that position the slides while permitting flow of liquid through the control bores. The flow of liquid past the slide is not, however, generally preferred since it may involve difficulties arising from the flow of liquid past the slide.

Although it is generally convenient to have the control bore and slide circular in cross section as indicated for Figures 1 and 2, this is not essential, and other shapes, e. g., rectangular, as shown in Figure 3, may be used. The cross-sectional shape of these parts may be subject to wide variations without affecting the operation.

The radially protruding part 7 of the slide may be shaped as a vane extending in the axial direction of the rotor 2, provided the remainder of the slide has sufficient volume to displace an amount of liquid which will give the desired variation in the equilibrium position. This is shown in Figure 4, wherein the rotor 31 has a slide 32 with a vane 33 extending in the axial direction.

Furthermore, it is not necessary that the protruding part of the slide extend in an axial direction over the whole extent of the radial clearance space 3, although this is generally preferable. As shown in Figure 1 this is effected by reducing the axial extent of the casing outward from the rotor.

Although generally employed for governing the maximum speed of a gas turbine, it will be appreciated that the control means of the present invention may also be used for governing gas turbines or other engines over any desired part of the speed range, or at any other predetermined speeds.

Figure 5 shows two curves indicating the relationship between the factor:

$$10^6 \times \frac{\text{pressure of fuel (p. s. i.) at outlet 17}}{(\text{R. P. M. of rotor 2})^2}$$

and fuel density in the case of a centrifugal apparatus as shown in Figures 1 and 2 (curve a—b—c) and in the case of a similar apparatus having no slide 5 (curve d—e). It will be noted that the curve a—b—c varies only between 2.05 and 2.065 as the fuel density varies between 0.70 and 0.84, a result which insures satisfactory gas turbine operation over a much wider range of fuel densities than is normally encountered. The curve d—e shows a linear relationship between the quantities plotted.

The use of a spring such as the spring 10 of Figures 1 and 2, is not always necessary; the spring may be dispensed with and the radially inwardly acting force on the slide is then derived primarily from the buoyancy of the slide in the liquid. This arrangement involves adjusting the buoyancy of the slide, instead of the characteristics of the spring, and also makes it preferable to construct the slide so that the center of buoyancy is displaced from the center of gravity

I claim as my invention:

1. In an apparatus for controlling the speed of a prime mover by means sensitive to the fluid pressure provided by a rotary centrifugal pressure producing device, which pressure is compensated so that it is constant at a predetermined speed of the prime mover irrespective of the density of the fluid involved, the combination comprising: a pressure actuated throttling valve in a flow line of said prime mover, a rotary centrifugal pressure producing device, conduit means connecting said pressure producing device to said throttling valve, said rotary centrifugal pressure producing device comprising, a casing having an outlet for connection to said throttling valve, a rotor mounted for rotation within said casing and forming an annular clearance space with said casing displaced outwardly from the axis of rotation of the rotor, said clearance space being in communication with said outlet, said rotor having a fluid passage interconnecting a radially inner part of the rotor to said annular clearance space; means for supplying said fluid to said inner part of the rotor for generally radially outward flow through said passage into the said clearance space; and a fluid engaging element on said rotor for imparting to liquid in the casing an angular momentum that increases with increased rotary speed of the rotor and with increased displacement of said element from the axis of rotation, said fluid-engaging element being movably attached to the rotor for rotation therewith and mounted for displacement to a variable distance outward from said axis of rotation and having means responsive to the density of said fluid for displacing said element inwards toward said axis upon an increase in the said density.

2. Apparatus according to claim 1 wherein said rotor includes guide means extending outwards from said axis of rotation and said liquid-engaging element is a slide mounted in said guide means with the center of mass thereof eccentric to said axis so as to be urged to increased displacement by centrifugal force, and the said means for displacing the element inwards includes a pair of opposed surfaces thereon situated at different distances out from said axis and exposed to the liquid in said casing.

3. Apparatus according to claim 1 wherein said casing is stationary and said clearance space is a radial clearance between the periphery of the rotor and the peripheral part of the casing, the rotor has a generally radial control bore, and the said liquid-engaging element is a slide movable within said control bore and positioned to protrude from the rotor into said radial clearance a variable distance in accordance with the position of the slide in the control bore to engage the liquid in the said clearance.

4. Apparatus according to claim 3 wherein said protruding part of the slide is bevelled with the shorter side of the slide leading in the direction of rotation.

5. Apparatus according to claim 3 wherein said protruding part of the slide is formed as a vane elongated in the axial direction of the rotor.

6. Apparatus according to claim 3 wherein the width of said protruding part of the slide, in the axial direction, is less than the width of the rotor and the axial extent of the part of said casing bounding said radial clearance space is less than the width of the rotor.

7. Apparatus according to claim 3 wherein said passage in the rotor includes at least one generally radial passage in addition to said control bore that houses the slide, said additional passage communicating at the inner end thereof with said control bore, for the free flow of liquid from the said inner part of the rotor to said radial clearance.

8. A rotary centrifugal fluid pressure producing device which produces a constant fluid pressure at a predetermined speed irrespective of the density of the fluid in said device comprising: a circular casing, a rotor mounted for rotation within said casing, an annular chamber concentric with said rotor between the periphery of said rotor and the inner wall of said casing, a radially movable slide mounted in said rotor, said slide having a beveled outer end face and an opposite inner end face located at a shorter radial distance from the axis of rotation of said rotor than said beveled outer end face, radial bores in said rotor, a tension spring attached to the said inner end face of said slide and to said rotor body, said slide and said spring being mounted in one of said radial bores, a fluid outlet in said casing at a point outward from the axis of rotation of said rotor and a fluid inlet along the axis of rotation of said rotor.

9. A rotary centrifugal fluid pressure device as provided in claim 8 wherein each radial bore in said rotor is provided with a radially movable slide.

References Cited in the file of this patent

UNITED STATES PATENTS

| | | |
|---|---|---|
| 1,550,286 | Sorge | Aug. 18, 1925 |
| 1,594,132 | Stewart | July 27, 1926 |
| 1,805,063 | Wrona | May 12, 1931 |
| 2,035,465 | Erskine et al. | Mar. 31, 1936 |
| 2,492,472 | Fortescue | Dec. 27, 1949 |
| 2,537,523 | Frost | Jan. 9, 1951 |
| 2,545,238 | MacMillin et al. | Mar. 13, 1951 |
| 2,575,923 | McMahan et al. | Nov. 20, 1951 |
| 2,621,672 | Jacobs | Dec. 16, 1952 |
| 2,621,913 | Ifield | Dec. 16, 1952 |
| 2,681,713 | Chambers | June 22, 1954 |
| 2,716,469 | Gassot | Aug. 30, 1955 |
| 2,756,810 | Simmons | July 31, 1956 |

FOREIGN PATENTS

| | | |
|---|---|---|
| 31,403 | France | Nov. 13, 1926 |
| | (Addition to 588,580) | |
| 550,239 | Great Britain | Dec. 30, 1942 |
| 721,726 | Great Britain | Jan. 12, 1955 |